Patented Jan. 10, 1939

2,143,282

UNITED STATES PATENT OFFICE 2,143,282

MERCURY PARASITICIDE AND PROCESS OF MAKING SAME

Alwyn C. Sessions, New Brunswick, N. J., assignor to California Spray-Chemical Corporation, Berkeley, Calif., a corporation of Delaware No Drawing. Application April 4, 1934, Serial No. 719,041

8 Claims. (Cl. 167—19)

This invention relates to a new parasiticidal composition containing mercury and to methods for its preparation and for its use.

The extreme toxicity of mercury in its more soluble compounds to substantially all forms of life is, of course, well known and has served many useful purposes. This well-nigh universal toxicity to vegetable, as well as to animal and insect life and apparently to all orders within a given kingdom, has constituted a very real barrier to the satisfactory application of mercury in economic pest control work.

The extremely limited success which has been met with in the application of any of the well known mercury compounds, either against fungus or insect infestations, has led to the synthesis of an ever increasing number of new mercury compounds, both inorganic and organic, in the hope that a compound of just the desired properties might be found. So far, however, little real success has been attained. The older compounds which had a certain usefulness when used on dormant hosts or on the less tender parts of verdant plants, were in most cases, equally satisfactory with the newer, more complicated and hence, more costly structures.

It is the object of the present invention to provide a new mercury containing material which retains the high toxicity of mercury when applied to lower forms of life, but is relatively non-injurious to higher forms.

It is a further object of this invention to provide an easily prepared mercury parasiticide of relatively low cost.

Another object of my invention is to provide a mercury compound which may be applied in spray form, in dust form or as a liquid bath.

It is still another object of my invention to provide a precipitated mercury silicate complex for parasiticidal use.

Still other objects will be apparent from the description and discussion which follows.

It is well known that when a solution of sodium silicate or water-glass is added to a dilute solution of mercuric chloride in water, no precipitate forms even on long standing. It is further well known that when a dilute solution of ammonia is added to a dilute solution of mercuric chloride in water, a white, somewhat flocculent precipitate of mercuric amine chloride, $Hg \cdot NH_2 \cdot Cl$, forms immediately.

I have now discovered that when a solution containing both sodium silicate and ammonia is added slowly and with agitation to a dilute solution of mercuric chloride, a voluminous white precipitate is thrown down. That this precipitate is not the amine chloride which is given by ammonia in the absence of silicate, is readily demonstrated by analysis, though an answer to the question as to just what the compound is, is not so readily provided.

The insoluble divalent compounds of mercury precipitated from alkaline solution are notoriously complex and variable as are also the silicate compounds of the heavy metals.

The precipitate which I have prepared contains a considerable amount of silicate in combined form and thus has a double reason for complexity and variability. Such analyses and tests as I have yet been able to make establish beyond doubt these two characteristics of my new compound, but give only a very general idea of its actual structure.

In preparing one particularly useful modification of this complex material, the following procedure may be followed:

Dissolve 50 pounds of mercuric chloride in 100 gallons of water. Dissolve 60 pounds of sodium silicate with a soda to silica weight ratio ($Na_2O/SiO_2$) of 1:2.8 in 150 gallons of water. Dissolve 12 pounds of aqua ammonia (27% $NH_3$) in 150 gallons of water and add this to the silicate solution. While the mercuric chloride solution is undergoing violent agitation, the ammonia-silicate solution is slowly and uniformly added, care being taken to cease the addition when the mixture has reached the neutral point, pH 6.5–7.5, as determined by an indicator. At this point, substantially all of the mercury will have been precipitated and the highly lyophylic gel may be filtered, washed free of soluble salts and either barrelled as a paste, or dried and ground to a powder and stored for future use.

The material so prepared will contain mercury, silicate, chloride and trivalent negative or ammonia nitrogen in roughly the atomic proportions $3Hg:1Cl:2N:5SiO_2$. If a normal silicate of mercury resulted from the addition of a soluble silicate to a soluble mercury salt, it might easily be possible that the present material is merely a mixture of mercuric silicate and the ammoni-basic chloride or infusible white precipitate, $Hg \cdot NH_2 \cdot Cl$. Since, however, no mercury silicate has even been known to precipitate as such, it seems highly probable that my compound must be defined as a "complex" and not as a double salt or a mixed precipitate.

Irrespective of its exact chemical structure, I have found this mercury composition to be well suited for horticultural use, either as a fungicide or as an insecticide. It may be applied to growing vegetation in dilute aqueous suspension or as a dust, either alone or together with a carrier, with a minimum of injury to the host and a maximum of lethal action on the infestation.

When, however, it is desired to treat the bark of trees and more resistant vegetation or to disinfect seed or tubers such as potatoes or corms, it may be desirable to use a form of the reagent in which the mercury is somewhat more available. Such a composition may be produced by increasing the alkalinity of the precipitating agent, either through the use of a silicate having a higher ratio of soda to silica or by the use of more ammonia.

As an example of one such modification which I have used with marked success in the treatment of gladiolus corms for scab, the same procedure employed in the foregoing example was followed except that an amount of ammonia was used to give an ammonia to silica ratio of 1:3 by weight.

When four pounds, on a dry basis, of the material thus precipitated was suspended in two and one half gallons of water and the gladiolus corms given an instantaneous dip, very remarkable results were obtained. Two groups of corms were planted on May 10th, the one having been so treated and the other having received no treatment whatever. The results were as follows:

|  | Treated | Untreated |
|---|---|---|
| Blooms | Good | Poor |
| Harvest (corms) | 1217% | 850% |
| Scab: |  |  |
|   Severe | None | 66% |
|   Slight | 10% | 28% |
|   Disease free | 90% | 6% |

In general, as the alkalinity of the precipitating medium is increased, the percentage of mercury in the complex will increase and its availability will also increase. Conversely, as the soda to silica ratio is decreased or the amount of ammonia is decreased, the proportion of mercury in the complex will be found to decrease, while its safety in use on tender vegetation will be found to increase.

It is my belief that the lyophylic character of the precipitate and its stability and hence desirability in use is more or less directly proportional to its silicate content. It appears quite possible that this latter desirable feature is due to the well known high buffering power of the silicate ion and that the value of my invention may be due to having discovered a method whereby mercury and silicate may be precipitated in the same compound.

The foregoing examples have shown that such is possible when varying ratios of ammonia to silica and of ammonia to mercury are employed. It is also possible with varying ratios of silica to mercury and with various orders of admixing the several reagents. Analogous compounds may also be produced when other soluble salts of mercury are similarly treated though for economic reasons I have preferred to employ the chloride.

The ingredients and proportions given in the above examples are, therefore, not to be understood as limiting the invention. They are given solely as illustrative and explanatory of my broad method of producing a new and desirable parasiticidal compound of mercury, a complex mercury silicate.

Having now described my invention and taught how it may be employed, what I claim is:

1. A water-insoluble complex compound of mercury in which the mercury is chemically combined with silicate, ammonia nitrogen and a negative ion the simple mercuric salt of which is water soluble.

2. A water-insoluble hydrophyllic complex of mercury with silicate, chloride and ammonia nitrogen, mercury being substantially the sole electropositive component.

3. A water-insoluble mercury silicate complex resulting from the interaction of a solution of a simple water soluble mercuric salt and a solution of an alkali silicate and ammonia.

4. A parasiticide comprising a water-insoluble complex of mercury with silicate, ammonia nitrogen and a negative ion the simple mercuric salt of which is water soluble.

5. A parasiticide comprising a water-insoluble complex composed of mercury, silicate, chloride and ammonia nitrogen.

6. The method of preparing a water-insoluble complex silicate of mercury which comprises intermixing a water solution of a simple mercury salt with a solution containing an alkali silicate and ammonia nitrogen.

7. The method of preparing a water-insoluble complex silicate of mercury which comprises intermixing an alkali silicate solution containing ammonia with a solution of mercuric chloride.

8. The method of preparing a water-insoluble complex silicate of mercury which comprises intermixing a solution containing sodium silicate and ammonia with a solution of mercuric chloride until a final equilibrium pH of 7.0–7.2 is attained.

ALWYN C. SESSIONS.